Aug. 11, 1970  E. J. POITRAS ET AL  3,523,583
FIRE AND EXPLOSION SUPPRESSOR
Filed Jan. 18, 1968  2 Sheets-Sheet 1
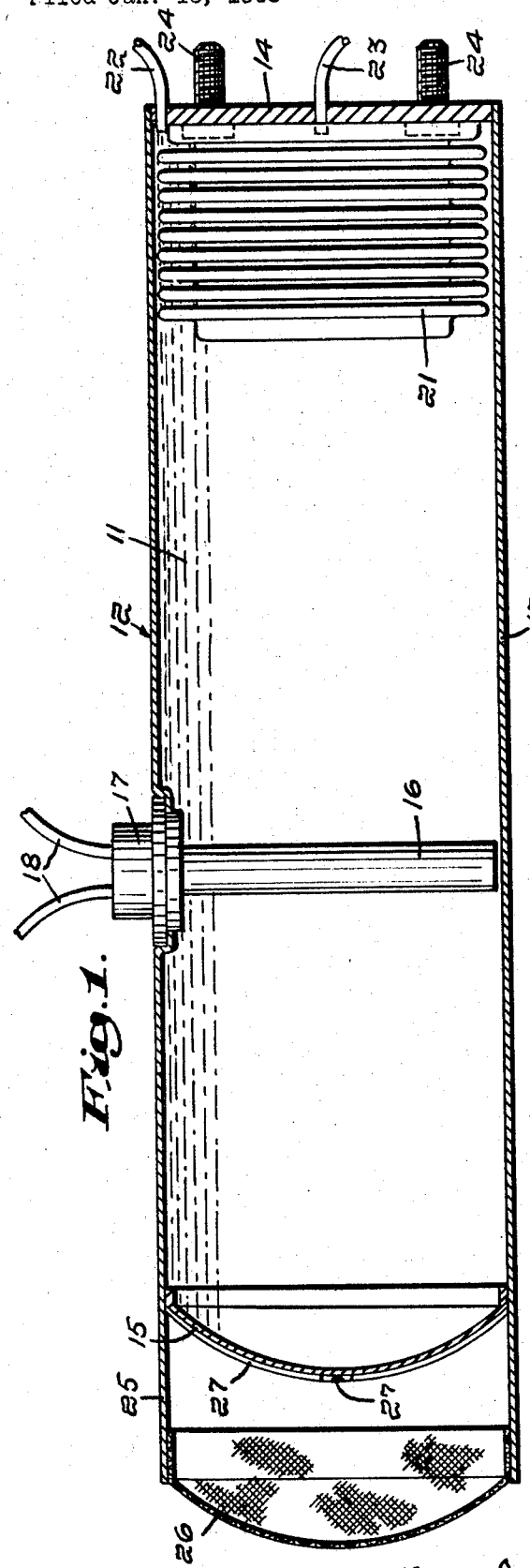
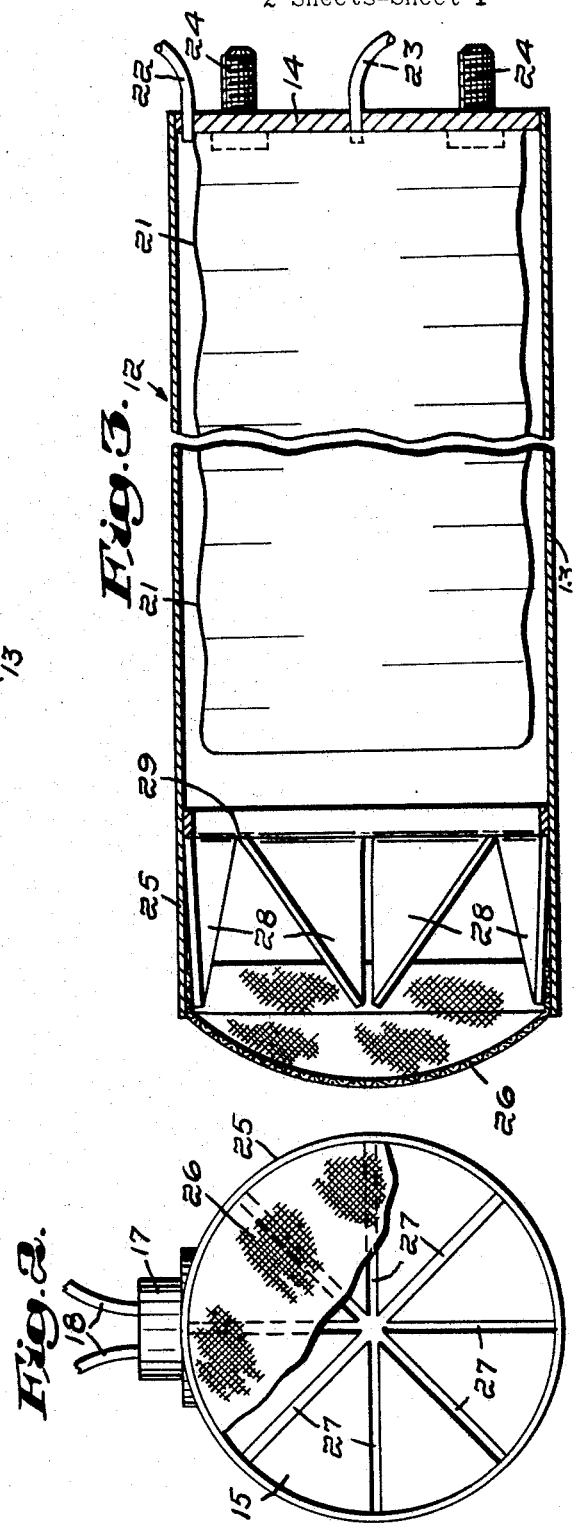
Inventors:
Edward J. Poitras,
Milton J. Morrisette,
by John E. Toupal Attorney

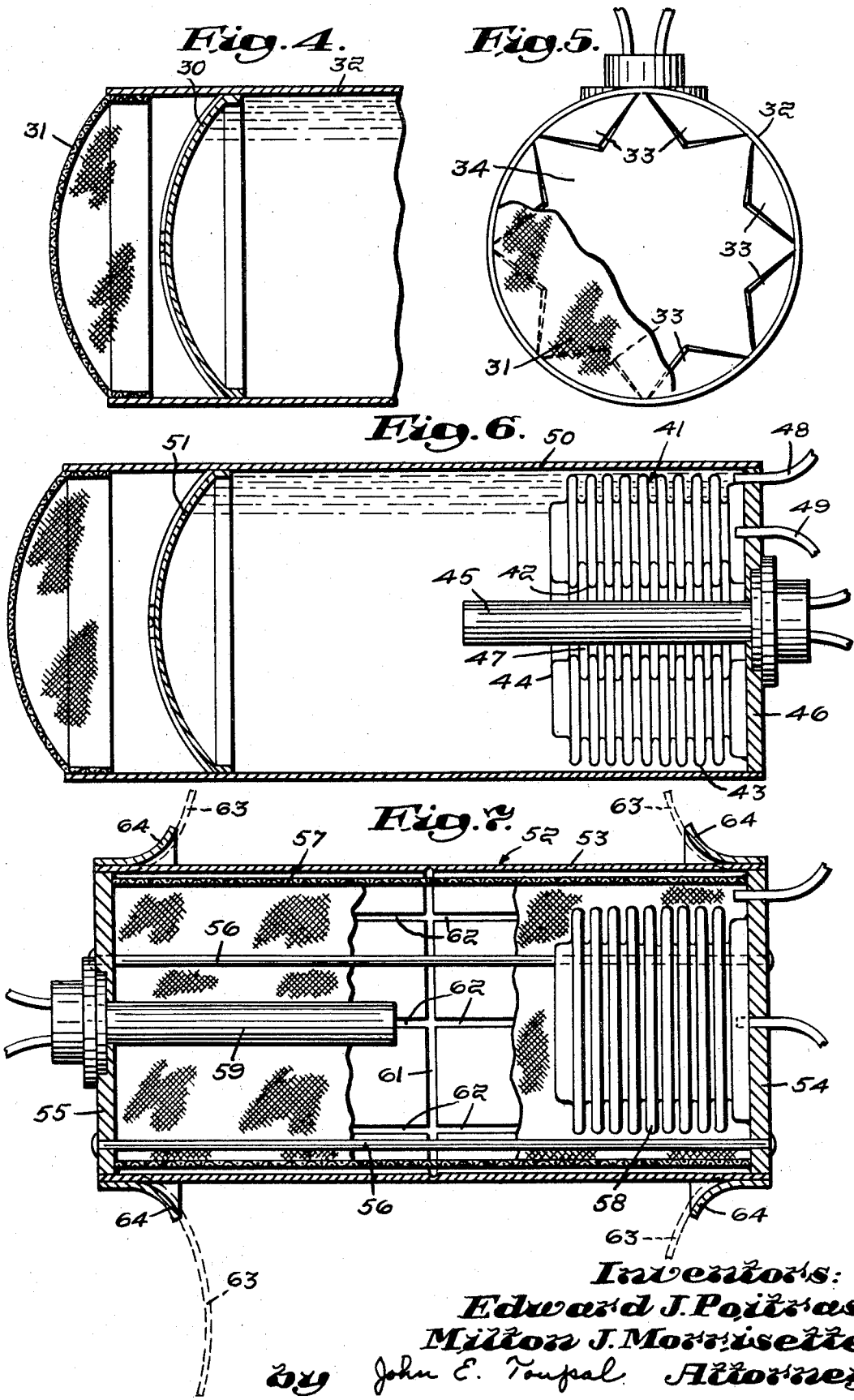

United States Patent Office 3,523,583
Patented Aug. 11, 1970

3,523,583
FIRE AND EXPLOSION SUPPRESSOR
Edward J. Poitras, Holliston, and Milton J. Morrisette, Ashland, Mass., assignors to Fenwal, Inc., Ashland, Mass.
Filed Jan. 18, 1968, Ser. No. 698,850
Int. Cl. A65c 35/08
U.S. Cl. 169—28                                22 Claims

ABSTRACT OF THE DISCLOSURE

A frangible fire suppressor having an automatically variable internal volume which compensates for temperature induced changes in the volume of its liquid suppressant content thereby preventing the formation of undesirable vapor bubbles.

This invention relates generally to a fire and explosion suppressor and, more particularly, relates to a fire and explosion suppressor of the frangible wall type.

A well-known type of fire and explosion suppressor utilizes a vessel filled with a suitable fire extinguishing fluid and having a frangible wall portion adapted to rupture and discharge the contained fluid. Such devices normally possess an internal detonator which is ignited in response to the sensing of some predetermined condition. Explosion of the detonator creates, within the extinguishing fluid, shock waves that rupture the frangible vessel portion and forcibly expel the contained fluid.

Although they are relatively simple and generally quite reliable, prior suppressors of this type do present problems when used in certain applications. For example, when used in environments experiencing wide ranges of ambient temperature, the contained suppressant fluid is subjected to substantial changes in volume which alter the characteristics of the shock waves generated by explosion of the detonator and can under certain conditions prevent rupture of the frangible wall portion.

This problem is accentuated in applications wherein the physical orientation of the suppressor unit is variable during use allowing the simultaneous existence of environmental conditions such that the volume of extinguishing fluid is relatively low and the device is oriented with the frangible wall portion in an upward position. In this case the body of extinguishing fluid and the frangible wall portion can be separated by a shock wave insulating vapor space which inhibits rupture of the frangible wall portion in response to explosion of the detonator. An obvious example of an application involving both the above variable conditions is fire suppression on aircraft which are subject to wide ranges of ambient temperature and to various physical orientations.

Another disadvantage of prior exploding suppressor devices is their inclination to expel metal fragments with the discharged extinguishing fluid. These fragments which can be created by both explosion of the detonator and rupture of the frangible wall portion are sometimes carried along with the expelled extinguishing fluid. Metal fragment discharge is particularly undesirable in applications involving fire protection of equipment, such as aircraft engines, which can be seriously damaged by the introduction of foreign materials.

The object of this invention, therefore, is to provide a simple and relatively inexpensive fire and explosion suppression device of the rupturable container type that operates reliably in a wide range of ambient temperatures and is unaffected by variation in physical orientation.

Another object of this invention is to provide a fire and explosion suppression device of the above type that does not expel metal fragments with the ejected extinguishing fluid.

One feature of this invention is the provision of a fire and explosion suppressor including a closed vessel filled with a fire extinguishing liquid and having a frangible wall portion, an enclosed detonator adapted to explode and rupture the frangible wall portion thereby creating a fluid discharge orifice in the vessel, and further including a movable wall adapted to automatically alter the volume enclosed by the vessel in response to ambient temperature changes of the contained extinguishing fluid. The movable wall maintains the vessel's inner volume equal to that of the contained extinguishing fluid over a wide range of ambient temperatures thereby preventing the formation of a vapor space which could inhibit rupture of the frangible wall portion.

Another feature of this invention is the provision of a fire and explosion suppressor of the above featured type wherein the movable wall is adapted after rupture of the frangible wall portion to move through a substantial portion of the vessel's interior volume thereby forcibly expelling the contained extinguishing liquid.

Another feature of this invention is the provision of a fire and explosion suppressor of the above featured type wherein the movable wall comprises a hollow expansible bellows assembly filled with a fluid under pressure. The bellows assembly expands to compensate for any decrease in extinguishing fluid volume thereby preventing the formation of an undesirable vapor filled space within the suppressor vessel.

Another feature of this invention is the provision of a fire and explosion suppressor of the above featured type wherein the closed vessel is a cylinder having one end wall comprising the frangible wall portion, the bellows assembly is mounted adjacent the opposite end wall of the cylinder and is adapted for expansion longitudinally therein, and the detonator is positioned between the frangible wall portion and the bellows assembly. This compact unit provides the above features in a suppressor device that produces a highly directional extinguishing fluid discharge.

Another feature of this invention is the provision of a fire and explosion suppressor of the next above featured type having an annular bellows assembly surrounding the detonator which is mounted in the vessel's end wall opposite the frangible wall portion. In this arrangement the bellows assembly is free to expand along the detonator which cannot prevent movement thereof.

Another feature of this invention is the provision of a fire and explosion suppressor of the above featured types wherein the vessel's cylindrical side wall extends beyond the frangible end wall portion and supports a screen member adapted to cover the discharge orifice created by rupture of the frangible wall portion. In addition to inducing a desirable patterned dispersion of the discharging extinguishing liquid, the screen member prevents the expulsion of metal fragments produced either by explosion of the detonator or by rupture of the frangible wall portion.

Another feature of this invention is the provision of a fire and explosion suppressor of the above featured type wherein the screen member is spaced from the frangible end wall portion by a distance at least as great as the radius of the cylindrical vessel. With this minimum spacing, the petals created by rupture of the frangible wall portion are free to open completely thereby providing an orifice with a uni-directional discharge characteristic.

Another feature of this invention is the provision of a fire and explosion suppressor of the next above featured type wherein the screen member is spaced from the frangible end wall portion by a predetermined distance less than the radius of the cylindrical vessel. The spacing between the screen member and frangible wall portion is used to control the extent to which the petals formed by rupture of the frangible wall portion can open thereby establishing a desired discharge pattern for the expelled extinguishing liquid.

Another feature of this invention is the provision of a fire and explosion suppressor of the third featured type wherein the vessel is a cylinder having a cylindrical side wall comprising the frangible wall portion and including a cylindrical screen member positioned within the vessel directly adjacent the cylindrical side wall. The screen member provides a desirable patterned dispersion of the discharged extinguishing liquid and prevents expulsion of metal fragments formed during explosion of the detonator.

Another feature of this invention is the provision of a fire and explosion suppressor of the above featured type wherein the cylindrical side wall is adapted to rupture into a plurality of outwardly opening longitudinally disposed wall strips terminating adjacent the ends of the cylinder and including outwardly flared ring members mounted on those ends. The ring members distribute the bending moment exerted on the opening wall strips and prevent complete separation thereof from the vessel.

These and other objects and features of the present invention will become more apparent upon a perusal of the following specification taken in conjunction with the accompanying drawings wherein:

FIG. 1 is a partial cross-sectional view of a preferred embodiment of the invention;

FIG. 2 is a partially broken away end view of the embodiment shown in FIG. 1;

FIG. 3 is a schematic cross-sectional view of the embodiment in FIG. 1 shown after actuation;

FIG. 4 is a partial cross-sectional view of an embodiment with a modified discharge orifice;

FIG. 5 is a partially broken away end view of the embodiment of FIG. 4 after actuation;

FIG. 6 is a partial cross-sectional view of another embodiment of the invention; and FIG. 7 is a cross-sectional view of still another embodiment of the invention.

A liquid fire extinguishing agent 11 fills the vessel 12 which is formed by the hollow metal cylinder 13 closed by the circular end wall 14 and the outwardly concave end wall 15. Supported by and extending into the cylinder 13 is the detonator unit 16. Extending out of the junction box 17 are electrical leads 18 adapted to provide a pulse of electrical current for detonating the explosive charge retained by the detonator unit 16.

Positioned within the vessel 12 and attached to the end wall 14 is the hollow expansible bellows assembly 21. The circular end wall 14 also accommodates the fill tube 22 which provides fluid communication with the interior of the vessel 12. The fill tube 23 similarly provides fluid communication with the interior of the hollow bellows 21 which is fluid tightly sealed from the interior of the vessel 12. Also supported by the end wall 14 are the lugs 24 adapted to permit mounting of the vessel 12 in a suitable location.

The cylinder 13 includes the extended wall portion 25 that extends beyond the end wall 15 and supports the metallic screen member 26. As shown in FIG. 2, the end wall 15, preferably formed of a ductile metal, is made frangible by being scored in the radially disposed areas 27.

After assembly, the interior of the vessel 12 is filled with a suitable liquid extinguishing agent such as, for example only, methyl bromide or similar halogen suppressant through the fill tube 22 which is then sealed. The hollow bellows assembly 21 then is charged through the fill tube 22 with a pressurizing gas such as nitrogen to a pressure of, for example, 200–250 lbs. per square inch and the fill tube 23 sealed. Both of these filling procedures are preferably performed at typical room temperatures of about 70° F. After filling, the vessel 12 is mounted in a location where fire protection is desired such as in the housing of an aircraft engine. The leads 18 are connected to a conventional sensor mechanism which provides an electrical pulse in response to a given condition. The sensor can be, for example, a rate of pressure rise detector, an absolute pressure detector, a flame detector, smoke detector, heat detector, etc.

Subsequently, if the vessel is subjected to variations in ambient temperature, the bellows assembly 21 will expand or contract to compensate for changes in the volume of the liquid 11. For example, at temperatures below the filling temperature, the body of liquid 11 will contract tending to create a vapor filled space within the vessel 12. However, simultaneous expansion of the pressurized bellows 21 increases its volume to exactly compensate the reduced volume of the liquid body 11. Conversely, at temperatures above the filling temperature, the liquid body 11 expands and its increased volume is exactly compensated by the forcible contraction of the bellows 21. Thus, over a wide range of ambient temperatures of, for example, between −60° and +200° F., the automatically variable free space within the vessel 12 remains completely filled with the extinguishing liquid 11. This prevents the formation of a vapor bubble which could both reduce the magnitude of the shock waves generated by ignition of the detonator 16 and isolate the wall portion 15 from those shock waves if the vessel 12 were oriented with the wall 15 in an upward position. Either of these factors prevent the desired fracture of the frangible wall 15.

When the explosive charge in the detonator unit 16 is ignited by the sensed condition, its explosive force creates shock waves in the extinguishing liquid 12. The compressive force generated by these waves ruptures the frangible end wall 15 along the scored areas 27. Rupture of the wall 15 produces the petals 28 which are forced outwardly as shown in FIG. 3 forming a discharge orifice 29. The contained extinguished fluid 11 then is freely expelled through the discharge orifice 29 and covering metal screen 26 toward the area in which the activating condition was sensed. The discharge of the extinguishing liquid 11 is enhanced by the bellows assembly 21 which is expanded by its internal gas pressure through substantially the entire length of the vessel 12 thereby forcibly discharging the contained liquid.

In addition to desirably dispersing the extinguishing liquid 11 expelled through the discharge orifice 29, the screen member 26 prevents escape from the vessel 12 of any metal fragments formed during actuation of the device. Such metal fragments can be formed either during the explosive fracture of the detonator unit 16 or by complete severance of the petals 28 during rupture of the end wall 15. This is an extremely important feature in applications involving the protection of moving mechanical equipment such as aircraft engines wherein the introduction of foreign material can produce serious damage. The screen member 26 serves the additional function of protecting the weakened wall 15 from external damage prior to activation of the detonator 16.

The screen 26 is spaced from the wall 15 by a distance greater than the radius of the cylinder 13. Thus, as shown in FIG. 3, the petals 28 are allowed to fully open forming a discharge orifice 29 having substantially the same diameter as the cylinder 13. For this reason, the expelled liquid 11 is not deflected and a highly directional, columnar discharge is produced.

FIG. 4 shows another embodiment of the invention with a modified frangible end wall and screen arrangement. In this embodiment, the frangible end wall 30 is spaced from the screen member 31 by a distance less than the radius of the cylinder 32. Thus, after rupture of the frangible end wall 30, the expanding petals 33 engage the screen 31 forming the partially open orifice 34 shown in FIG. 5. Therefore, extinguishing liquid expelled through the orifice 34 is deflected by the inwardly projecting petals 33 producing an enlarged discharge pattern. By suitably dimensioning the petals 33 and the spacing between the frangible end wall and the screen 31, a wide variety of extinguishing liquid discharge pattern can be obtained.

FIG. 6 shows another embodiment of the invention with a modified bellows and detonator arrangement. In this embodiment the bellows assembly 41 is an annular unit formed by inner 42 and outer 43 walls joined by the annular end wall 44. The detonator unit 45 is supported by the end wall 46 and is accommodated by the central cavity 47 in the bellows assembly 41. Also passing through the end wall 46 are the fill tubes 48 and 49 which allow fluid communication, respectively, with the interiors of the vessel 50 and the bellows assembly 41. Opposite the end wall 46 is a frangible end wall 51 of the type shown in FIG. 1.

Operation of this embodiment is identical to that described above. However, this device is especially suited for applications wherein space limitations prevent the use of a transversely disposed detonator unit as shown in FIG. 1. The FIG. 6 embodiment also possesses the additional advantage that the bellows 41 can expand fully even though the detonator unit 43 is not completely disintegrated by its explosive charge.

FIG. 7 shows another vessel 52 having the hollow cylinder 53 closed by the circular end walls 54 and 55. Extending through the cylinder 53 and the end walls 54 and 55 and attached, for example by welds, to the outer surfaces thereof are the tie rods 56. The cylindrical screen 57 having a diameter which approximates that of the hollow cylinder 53 is positioned directly adjacent the inner surface thereof between the end walls 54 and 55. Mounted within the cylinder 53 on the end walls 54 and 55, respectively, are the bellows assembly 58 and the detonator unit 59. The surface of the cylinder 53 is circumferentially scored in the area 61 and in the longitudinally disposed areas 62 joined therewith and extending to the end walls 54 and 55.

Again, the operation of this embodiment is similar to that described above. Upon energization and exploding of the detonator unit 59, the resultant shock waves rupture the cylinder 53 along the scored areas 61 and 62. This divides the cylinder 53 into longitudinally disposed strips 63 which are forced outwardly into the positions shown dotted in FIG. 7. The outwardly flared ring members 64 mounted at each end of the vessel 52 engage the metal strips 63 and distribute the bending moments applied to the terminal portions thereof. This distribution of bending moment reduces the possibility of having individual strips 63 completely severed from the vessel 52 and discharged into the surrounding environment. Similar protection is provided by the screen 57 which prevents escape from the vessel 52 of metal fragments produced during explosive fracture of the detonator unit 59. As above, the bellows assembly 58 expands within the vessel 52 and, in this case, forcibly expels the contained liquid in all directions from the 360° discharge orifice created by opening of the strips 63.

Obviously, many modifications and variations of the present invention are possible in light of the above teachings. For example only, the individual structural features disclosed in the various embodiments can be utilized in combinations other than those shown. It is, therefore, to be understood that the invention can be practiced otherwise than as specifically described.

What is claimed is:

1. Fire and explosion suppression apparatus comprising a closed vessel filled with a fire extinguishing fluid, said closed vessel having a frangible wall portion adapted for rupture to create a fluid discharge orifice in said vessel, said vessel also having a movable wall portion adapted to alter the volume enclosed by said vessel in response to ambient temperature changes of said extinguishing fluid, and detonator means adapted upon energization to rupture said frangible wall portion, said movable wall portion being disposed to permit rupture of said frangible wall portion in response to detonation of said detonating means.

2. Fire and explosion suppression apparatus according to claim 1 including pressure exerting means adapted to move said movable wall portion through said vessel to forcibly expel said extinguishing fluid from said vessel in response to rupture of said frangible wall portion.

3. Fire and explosion suppression apparatus according to claim 1 wherein said extinguishing fluid is a liquid and said detonator is located within said closed vessel.

4. Fire and explosion suppression apparatus according to claim 1 wherein said movable wall portion comprises a hollow expansible bellows assembly filled with a fluid under pressure.

5. Fire and explosion suppression apparatus according to claim 4 wherein said extinguishing fluid is a liquid and said detonator is located within said closed vessel.

6. Fire and explosion suppression apparatus according to claim 5 wherein said bellows assembly is adapted to be expanded by said fluid under pressure so as to fill a substantial portion of said vessel after rupture of said frangible wall portion.

7. Fire and explosion suppression apparatus according to claim 6 wherein said closed vessel is a cylinder having one end wall comprising said frangible wall portion, said bellows assembly is mounted adjacent the opposite end wall of said cylinder and adapted for expansion longitudinally therein, and said detonator means is positioned between said frangible wall portion and said bellows assembly.

8. Fire and explosion suppression apparatus according to claim 7 including a screen member mounted on said vessel so as to substantially cover the discharge orifice created by rupture of said frangible wall portion.

9. Fire and explosion suppression apparatus according to claim 8 wherein the cylindrical side wall of said cylinder comprises an extended wall portion extending beyond said frangible end wall portion and said screen member is supported by said extended wall portion.

10. Fire and explosion suppression apparatus according to claim 9 wherein said screen member is spaced from said frangible end wall portion by a distance at least as great as the radius of said cylinder.

11. Fire and explosion suppression apparatus according to claim 9 wherein said screen member is spaced from said frangible end wall portion by a distance less than the radius of said cylinder.

12. Fire and explosion suppression apparatus according to claim 6 wherein said closed vessel is a cylinder having a cylindrical side wall comprising said frangible wall portion.

13. Fire and explosion suppression apparatus according to claim 12 wherein said cylindrical side wall is adapted to rupture into a plurality of outwardly flared longitudinally disposed wall strips terminating adjacent one end of said cylinder, and including distribution means adapted to distribute the bending moment exerted on said wall strips so as to prevent complete separation thereof from said vessel.

14. Fire and explosion suppression apparatus according to claim 13 including a cylindrical screen member positioned within said vessel directly adjacent said cylindrical side wall and adapted to cover the discharge orifice created by rupture of said frangible wall portion.

15. Fire and explosion suppression apparatus according to claim 6 wherein said closed vessel is a cylinder having one end wall comprising said frangible wall portion, said bellows assembly is an annular unit mounted adjacent the opposite end wall of said cylinder and adapted for expansion longitudinally therein, and said detonator means is supported by said opposite end wall within a central cavity in said annular bellows unit.

16. Fire and explosion suppression apparatus according to claim 15 including a screen member mounted on said vessel so as to substantially cover the discharge orifice created by rupture of said frangible wall portion.

17. Fire and explosion suppression apparatus according to claim 16 wherein the cylindrical side wall of said cylinder comprises an extended wall portion extending beyond said frangible end wall portion and said screen member is supported by said extended wall portion.

18. Fire and explosion suppression apparatus according to claim 17 wherein said screen member is spaced from said frangible end wall portion by a distance at least as great as the radius of said cylinder.

19. Fire and explosion suppression apparatus according to claim 17 wherein said screen member is spaced from said frangible end wall portion by a distance less than the radius of said cylinder.

20. Fire and explosion suppression apparatus comprising a closed vessel filled with a fire extinguishing fluid, said closed vessel being a cylinder with an end wall including a frangible wall portion, said vessel further comprising a cylindrical side wall with an extended wall portion extending beyond said frangible end wall portion, detonator means disposed within said vessel and adapted upon energization to rupture said frangible end wall portion, a screen member supported by said extended wall portion so as to substantially cover a fluid discharge orifice created by rupture of said frangible end wall portion and wherein said screen member is spaced from said frangible end wall portion by a distance at least as great as the radius of said cylinder.

21. Fire and explosion suppression apparatus comprising a closed vessel filled with a fire extinguishing fluid, said closed vessel being a cylinder with an end wall including a frangible wall portion, said vessel further comprising a cylindrical side wall with an extended wall portion extending beyond said frangible end wall portion, detonator means disposed within said vessel and adapted upon energization to rupture said frangible end wall portion, a screen member supported by said extended wall portion so as to substantially cover a fluid discharge orifice created by rupture of said frangible end wall portion and wherein said screen member is spaced from said frangible end wall portion by a distance less than the radius of said cylinder.

22. Fire and explosion suppression apparatus according to claim 23 wherein said screen means is adapted to limit outward movement of said frangible wall portion after rupture thereof thereby creating deflectors that deflect said extinguishing fluid discharge through said discharge orifice so as to produce a predetermined discharge pattern.

References Cited

UNITED STATES PATENTS

| | | | |
|---|---|---|---|
| 1,348,565 | 8/1920 | Jenkins | 169—26 |
| 1,708,869 | 4/1929 | Buddecke | 169—28 |
| 1,878,490 | 10/1932 | Goss | 169—28 X |
| 2,016,668 | 10/1935 | Current et al. | 169—26 |
| 2,815,152 | 12/1957 | Mills | 222—386.5 |
| 2,787,330 | 4/1957 | Mathisen | 169—28 |
| 3,083,870 | 4/1963 | Gillespie | 222—386.5 |

ROBERT B. REEVES, Primary Examiner

H. S. LANE, Assistant Examiner